United States Patent
Romero Contreras et al.

(10) Patent No.: US 10,065,564 B2
(45) Date of Patent: Sep. 4, 2018

(54) HINGE ASSEMBLY FOR A CARGO SYSTEM AND METHOD OF SECURING A LID TO A CARGO BIN

(71) Applicant: GM GLOBAL TECHNOLOGY OPERATIONS LLC, Detroit, MI (US)

(72) Inventors: Javier Romero Contreras, Zinacantepec (MX); Rodrigo Ruiz Espinoza, Toluca (MX); Patricia Celedon Barcena, Metepec (MX)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/250,173

(22) Filed: Aug. 29, 2016

(65) Prior Publication Data

US 2017/0306672 A1   Oct. 26, 2017

Related U.S. Application Data

(60) Provisional application No. 62/325,114, filed on Apr. 20, 2016.

(51) Int. Cl.
*B60R 7/02* (2006.01)
*E05D 7/12* (2006.01)

(52) U.S. Cl.
CPC ............... *B60R 7/02* (2013.01); *E05D 7/12* (2013.01); *E05Y 2900/538* (2013.01)

(58) Field of Classification Search
CPC .... B60R 5/04; B60R 7/04; B60R 7/02; B60R 7/043; B60R 13/013; B60R 11/06; B60R 2011/0007; B60R 2011/0075; E05C 19/022; E05F 1/1058; E05F 1/1261; E05F 5/10; E05B 83/32

USPC ..... 296/37.14, 37.16, 193.07, 65.09, 18, 66, 296/16, 193

See application file for complete search history.

(56) References Cited

U.S. PATENT DOCUMENTS

| 4,760,623 | A | * | 8/1988 | Toyama | E05D 7/0407 16/238 |
| 5,208,943 | A | * | 5/1993 | Dubach | E05D 5/08 16/258 |
| 5,245,727 | A | * | 9/1993 | Sasaki | E05D 5/08 16/240 |

(Continued)

FOREIGN PATENT DOCUMENTS

| CN | 101280655 A | 10/2008 |
| CN | 202284425 U | 6/2012 |

(Continued)

*Primary Examiner* — D Glenn Dayoan
*Assistant Examiner* — Sunsurraye Westbrook
(74) *Attorney, Agent, or Firm* — Quinn IP Law (57) ABSTRACT

A system comprises a hinge assembly and an anchor. The anchor has a base, a head, and a pin connecting the base and the head. The hinge assembly has an aperture and a notch narrower than the aperture extending from the aperture. The head fits through the aperture, and the notch is configured to receive the pin when the hinge assembly is translated toward the pin with the head through the aperture. The hinge assembly releasably clips to the pin to retain the hinge assembly in an engaged position when the notch receives the pin. The system may be a cargo system in a vehicle, with the lid serving as a vehicle load floor. A method of securing a lid to a cargo bin in a vehicle utilizes the system.

20 Claims, 8 Drawing Sheets

(56) References Cited

U.S. PATENT DOCUMENTS

| | | | | |
|---|---|---|---|---|
| 7,422,047 B1 * | 9/2008 | McDonald | ................ | B60R 7/04 |
| | | | | 160/229.1 |
| 7,480,962 B2 * | 1/2009 | Takamatsu | ................ | E05D 5/08 |
| | | | | 16/258 |
| 7,488,024 B1 * | 2/2009 | Medlar | ..................... | B60R 5/04 |
| | | | | 296/37.14 |
| 7,631,919 B2 * | 12/2009 | Schrader | ................ | B62D 25/10 |
| | | | | 296/37.14 |
| 8,281,459 B2 * | 10/2012 | Le | .......................... | E05D 3/022 |
| | | | | 16/350 |
| 9,481,310 B2 * | 11/2016 | Chawlk | ................... | B60R 7/043 |
| 2007/0052253 A1 * | 3/2007 | Sturt | ........................ | B60R 5/04 |
| | | | | 296/26.1 |
| 2008/0178428 A1 | 7/2008 | McDonald | | |

FOREIGN PATENT DOCUMENTS

| | | |
|---|---|---|
| CN | 203318298 U | 12/2013 |
| CN | 203381555 U | 1/2014 |
| DE | 7602078 U | 6/1976 |
| DE | 7733629 U | 2/1978 |
| DE | 4214979 A1 | 4/1993 |
| JP | H09303943 A | 11/1997 |

* cited by examiner

HINGE ASSEMBLY FOR A CARGO SYSTEM AND METHOD OF SECURING A LID TO A CARGO BIN

CROSS-REFERENCE TO RELATED APPLICATION

This application claims the benefit of U.S. Provisional Application No. 62/325,114, filed Apr. 20, 2016, which is hereby incorporated by reference in its entirety.

TECHNICAL FIELD

The present disclosure relates to a hinge assembly for a cargo system, and a method of securing a lid to a cargo bin.

BACKGROUND

Many vehicles utilize one or more storage cavities located under a vehicle load floor for storage space. In such vehicles, a user must move the load floor to access the storage cavity.

SUMMARY

A system and a method are disclosed that provide ease of access to a storage cavity selectively covered by a lid, such as a lid that serves as a vehicle load floor, while providing easy optional installation and removal of the lid. A system comprises a hinge assembly and an anchor. The anchor has a base, a head, and a pin connecting the base and the head. The hinge assembly defines an aperture and a notch narrower than the aperture extending from the aperture. The head fits through the aperture, and the notch is configured to receive the pin when the hinge assembly is translated toward the pin with the head through the aperture. The hinge assembly releasably clips to the pin to retain the hinge assembly in an engaged position when the notch receives the pin.

The system may be used in various applications, such as but not limited to a cargo system for a vehicle in which the anchor is secured to a cargo bin having a storage cavity, and the hinge assembly is secured to a lid that is configured to selectively cover the cavity in the bin and serve as a portion of a load floor.

For example, the hinge assembly may have a first leaf secured to the lid, and a second leaf pivotable relative to the first leaf about a hinge axis. The base may be secured to the bin adjacent the cavity. The aperture may be in the first leaf. The first leaf releasably clips to the pin to retain the hinge assembly in an engaged position when the notch receives the pin, the lid thereby being secured to the bin. The lid is pivotable between an open position in which the cavity is exposed, and a closed position in which the cavity is covered by the lid when the hinge assembly is in the engaged position.

A method of securing a lid to a cargo bin such as in a vehicle comprises aligning an aperture in a hinge assembly secured to the lid with an anchor secured to the cargo bin, and moving the lid toward the anchor with the lid over the bin until a head of the anchor passes through the aperture. The method further includes translating the lid in a first direction until a pin connected to the head is forced past protrusions of the hinge assembly into a notch in the hinge assembly. The method may then include pivoting the lid at a hinge axis of the hinge assembly between a first position and a second position. The lid covers the cavity in the first position, and the cavity is exposed when the lid is in the second position.

A user may desire to remove the lid to provide easier access to the cavity in the bin such as in a vehicle, and when the lid is not needed to serve as a portion of the vehicle load floor, or for maintenance on the lid, the hinge assembly, or the bin. In this case, the method includes translating the lid in a second direction opposite from the first direction until the pin is forced past the protrusions into the aperture, releasing the hinge assembly from the pin. The method then includes moving the lid away the anchor until a head of the anchor passes through the aperture and the aperture is above the anchor.

The above features and advantages and other features and advantages of the present teachings are readily apparent from the following detailed description of the best modes for carrying out the present teachings when taken in connection with the accompanying drawings.

DETAILED DESCRIPTION

Figure 1:
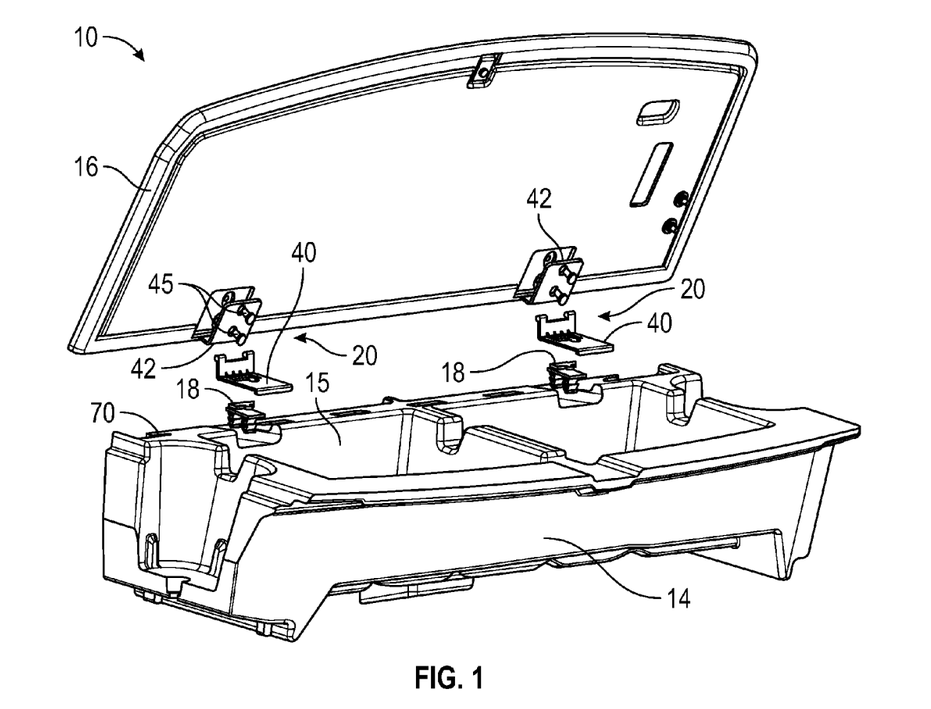
FIG. 1 is a schematic illustration in exploded view of a portion of a vehicle cargo system including a bin and a lid.
Figure 2:
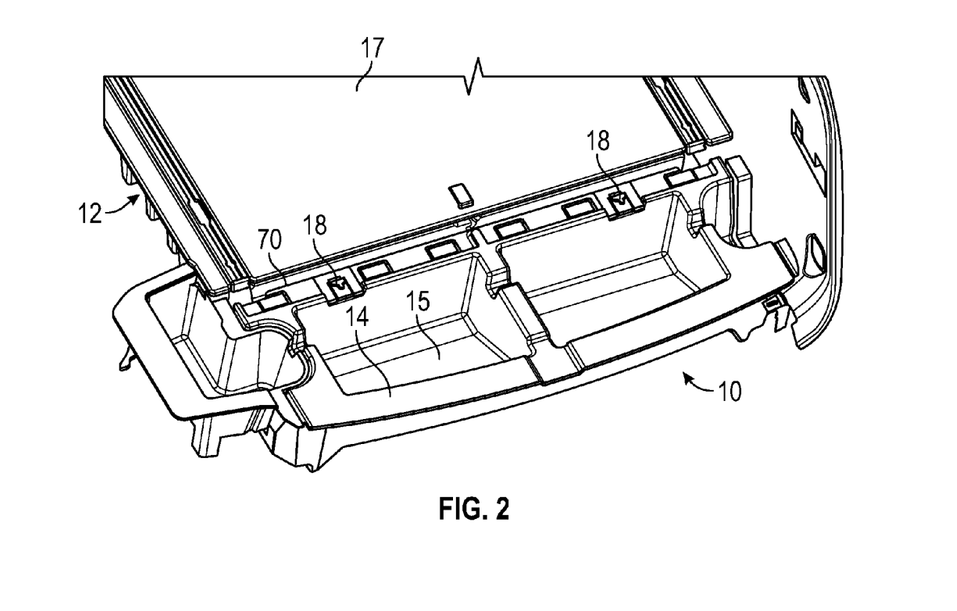
FIG. 2 is a schematic illustration in fragmentary perspective view of a vehicle with the cargo system of FIG. 1 and the lid removed.
Figure 12:
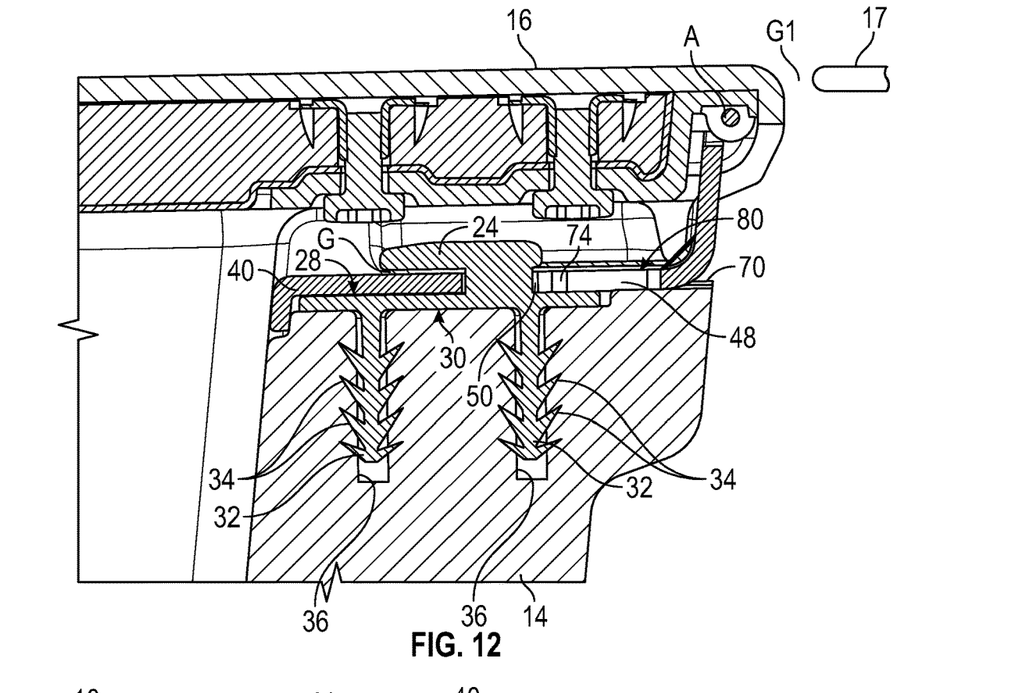
FIG. 12 is a schematic illustration in cross sectional view of the lid and the bin of FIG. 1 secured via the anchor and the hinge assembly of FIG. 3.
Figure 16:
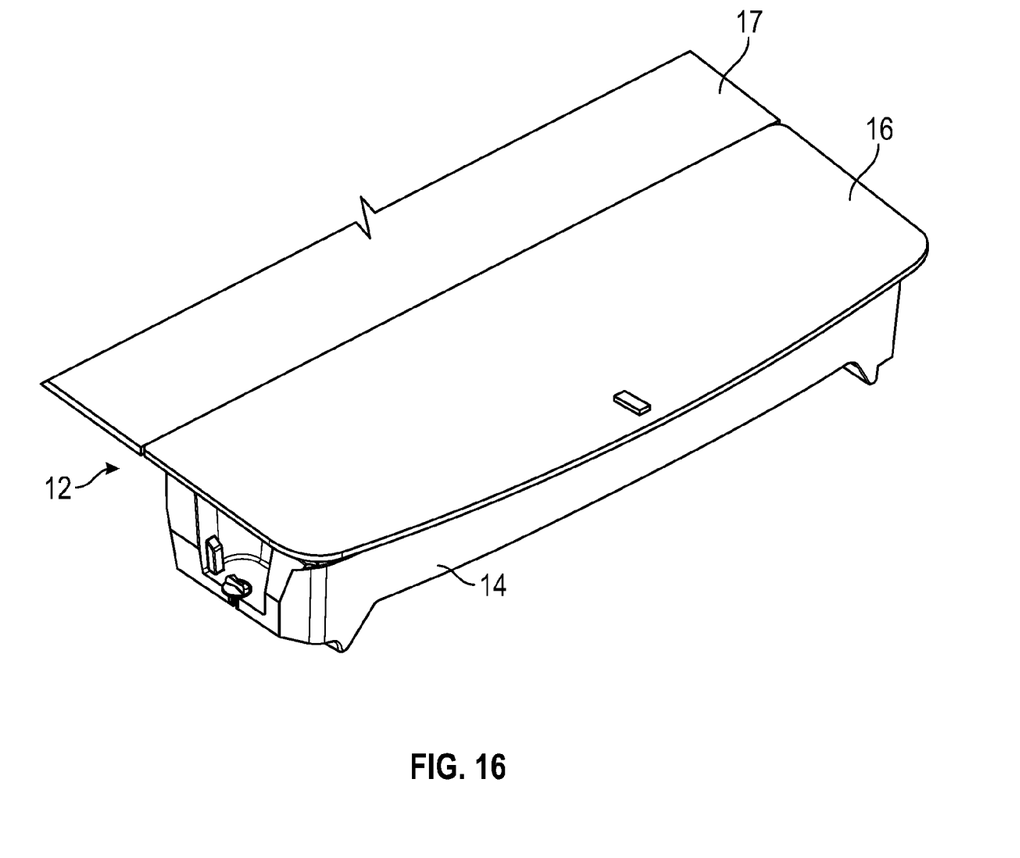
FIG. 16 is a schematic fragmentary illustration of the lid and the bin of FIG. 15, with the lid pivoted to a closed position.

Referring to the drawings, wherein like reference numbers refer to like components throughout the views, FIGS. 1 and 2 show a cargo system 10 such as for a vehicle 12. The cargo system 10 includes a bin 14 with a cavity 15, and a lid 16. When used in the vehicle 12, the lid 16 serves as part of a vehicle load floor. More specifically, FIG. 2 shows a first load floor portion 17 at least partially surrounding the bin 14 above the cavity 15. The lid 16 is a second load floor portion that is substantially level and flush with the first load floor portion 17 when the lid 16 is in the closed position described herein, as best shown in FIGS. 12 and 16. The vehicle 12 is shown for illustrative purposes and demonstrates only one possible embodiment. It is understood that the vehicle 12 may be any mobile platform, such as an airplane, all-terrain vehicle (ATV), automotive vehicle such as a sport utility vehicle, boat, personal movement device, robot and the like to accomplish the purposes of this disclosure.

The cargo system 10 includes an anchor 18 and a hinge assembly 20 that enable the the lid 16 to be releasably secured to the bin 14. In the embodiment shown, the cargo system 10 includes two anchors 18 secured to the bin 14 and spaced apart from one another. The cargo system 10 includes two hinge assemblies 20 spaced apart from one another as discussed herein. The lid 16 may be secured to the bin 14 by using the hinge assemblies 20, and this may be accomplished manually and without using any tools. Alternatively, the lid 16 may be secured to the bin 14 via an automated robot or the like. For example, initial attachment of the lid 16 during vehicle assembly may be automated, while attachment and removal during use by the customer may be manual. When secured to the bin 14, the lid 16 can be pivoted between a first, open position shown in FIG. 15, and a second, closed position shown in FIG. 16. The cavity 15 in the bin 14 is exposed when the lid 16 is in the open position, and the cavity 15 is covered by the lid 16 when the lid 16 is in the closed position.

Figure 3:
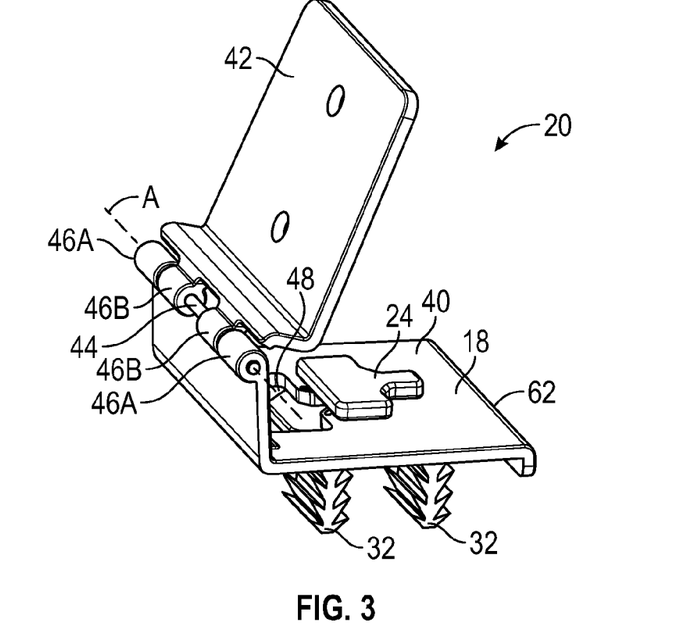
FIG. 3 is a schematic illustration in perspective view of a hinge assembly included in the cargo system of FIG. 1.
Figure 4:
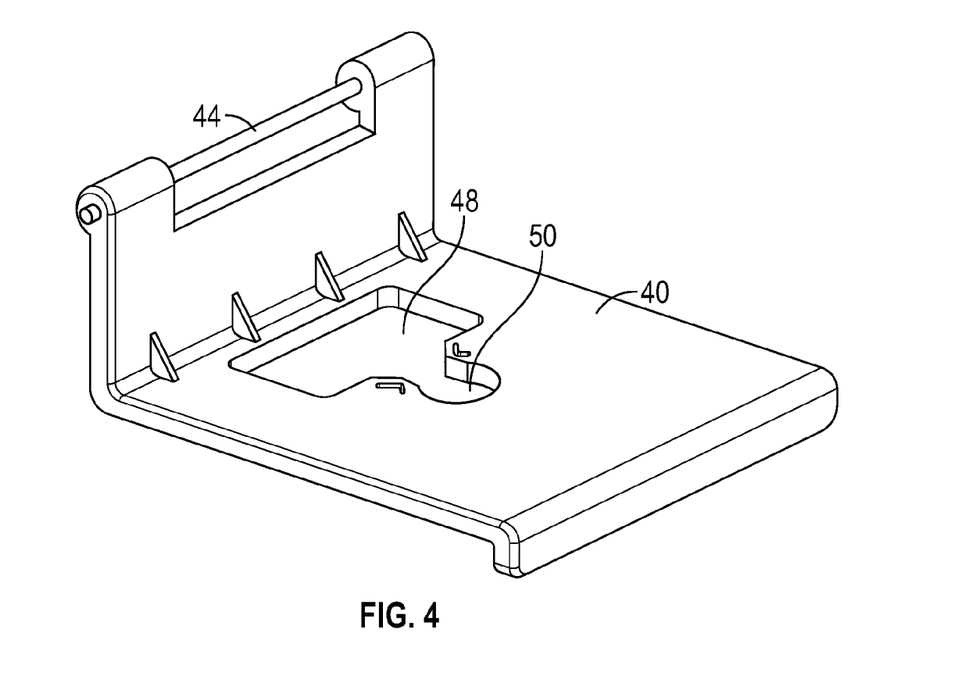
FIG. 4 is a schematic perspective illustration of a first leaf of the hinge assembly of FIG. 3.
Figure 7:
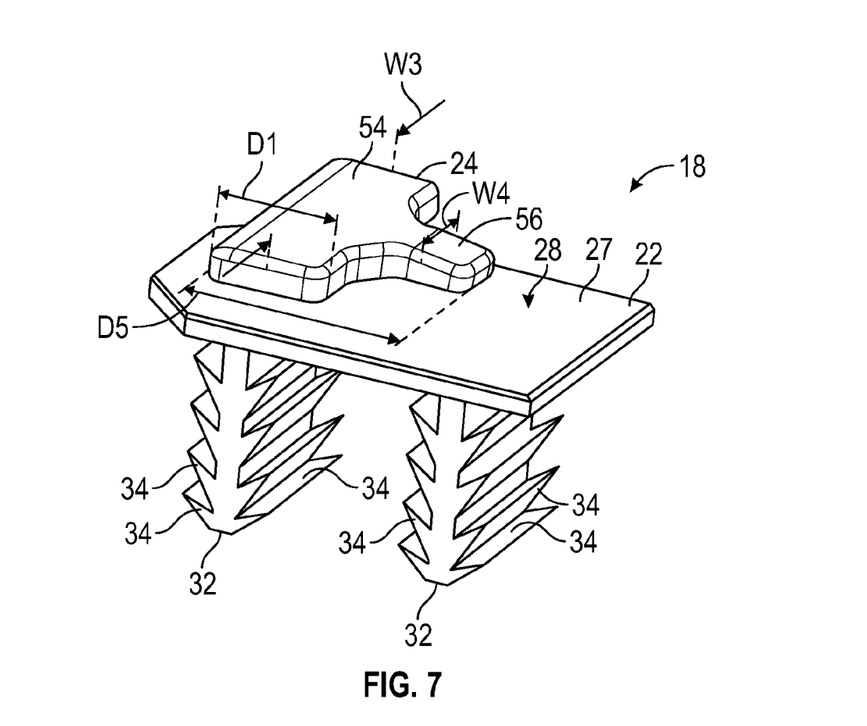
FIG. 7 is a schematic perspective illustration of an anchor included in the cargo system of FIG. 1.
Figure 8:
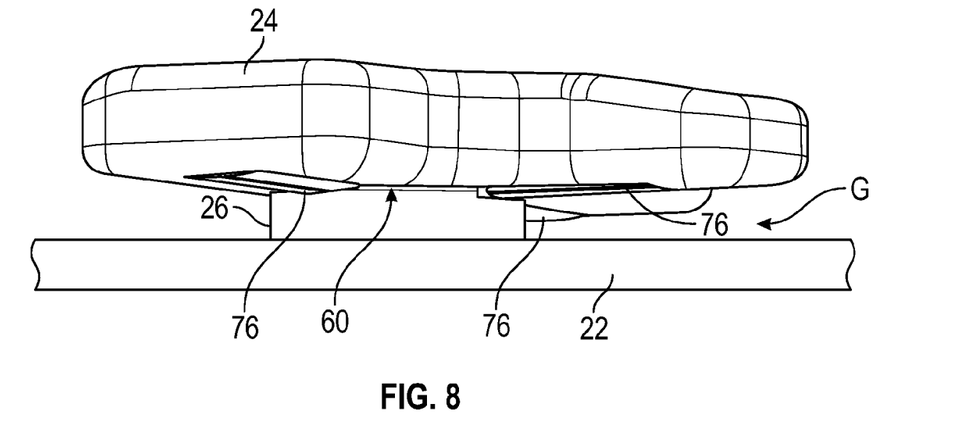
FIG. 8 is a schematic perspective fragmentary illustration of the anchor of FIG. 7.

One of the hinge assemblies 20 is shown releasably secured to one of the anchors 18 in FIG. 3. As best shown in FIGS. 7 and 8, the anchor 18 has a base 22, a head 24, and a pin 26 connecting the base 22 and the head 24. The pin 26 extends from the base 22 generally vertically when the anchor 18 is secured to the bin 14. More specifically, the base 22 includes a shelf 27 with a first face 28, and with a second face 30 opposite from the first face 28, as best shown in FIG. 12. The pin 26 extends outward from the first face 28. The base 22 includes two stakes 32 spaced apart from one another and extending outward from the second face 30 generally parallel with the pin 26. In the embodiment shown, the first and second faces 28, 30 are generally flat and parallel with one another. The pin 26 extends generally perpendicular to the first face 28. The stakes 32 extend generally perpendicular to the second face 30. Although two stakes 32 are shown in the embodiment of FIG. 7, the anchor 18 could instead only have one stake 32, in which case the single stake may be wider than each of the two stakes 32 and may be centered on the second face 30 to provide stability.

As shown in FIG. 7, each stake 32 has barbs 34 that extend upward toward the second face 30. The barbs 34 retain the stakes 32 to the bin 14. For example, the bin 14 may be a foam material, such as expanded polypropylene. The stakes 32 may be driven into the material of the bin 14. Optionally, the bin 14 can be preformed with guide holes 36 as shown in FIG. 12. When the stakes 32 are driven into the bin 14, the barbs 34 dig into the material, preventing removal of the anchor 18 from the bin 14 in the absence of a force in excess of what is expected under normal operating conditions.

Figure 5:
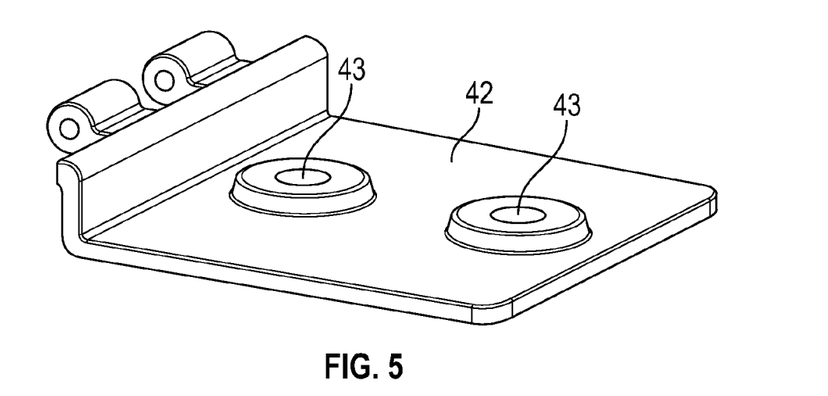
FIG. 5 is a schematic illustration in perspective view of a second leaf of the hinge assembly of FIG. 3.
Figure 6:
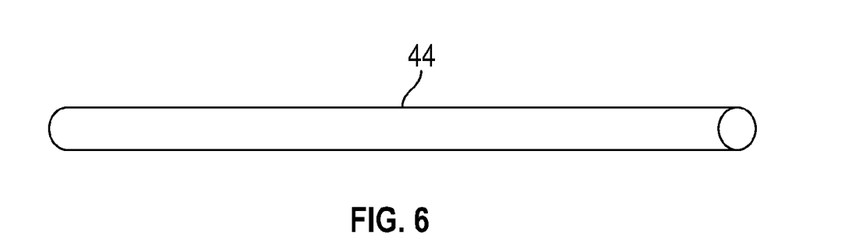
FIG. 6 is a schematic perspective illustration of a rod that connects the upper and lower leaves in the hinge assembly of FIG. 3.
Figure 13:
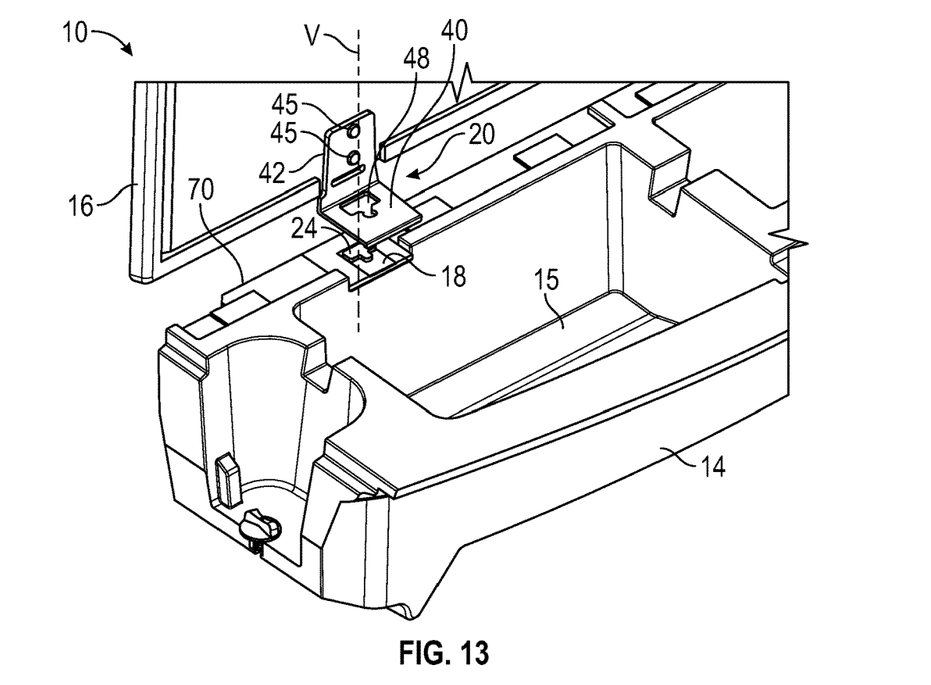
FIG. 13 is a schematic fragmentary illustration of the lid and the bin, with an aperture in the lower leaf aligned with a head of the anchor.

The hinge assembly 20 is selectively securable to and releasable from the anchor 18. As best shown in FIG. 3, the hinge assembly 20 has a first leaf 40 and a second leaf 42 hinged to the first leaf 40. The second leaf 42 is pivotable relative to the first leaf 40 about a hinge axis A. A rod 44 extends through knuckles 46A of the first leaf and the knuckles 46B of the second leaf 42 to pivotably secure the leaves 40, 42 to one another. When used in the vehicle 12, the second leaf 42 is secured to the lid 16. As shown in FIG. 5, the second leaf 42 has fastener openings 43 through which fasteners 45 extend and secure to the lid 16 as shown in FIGS. 1 and 13. The fasteners 45 allow easy removal of the hinge assembly 20 from the lid 16 if necessary to service the lid or the hinge assembly 20.

The anchor 18 may be plastic with a sufficient strength and durability to anchor the lid 16 during repeated cycling of pivoting of the lid 16 about the hinge axis A and repeated attachment and removal of the hinge assembly 20 from the anchor 18. The rod 44 may be metal to minimize bending along the axis A. The leaves 40, 42 may be plastic of a sufficient strength and flexibility to enable repeated flexing of the protrusions 46 at the strips 74 as discussed herein to securely snap the pin 26 into the notch 50 when attaching the lid 16 to the bin 14.

Figure 9:
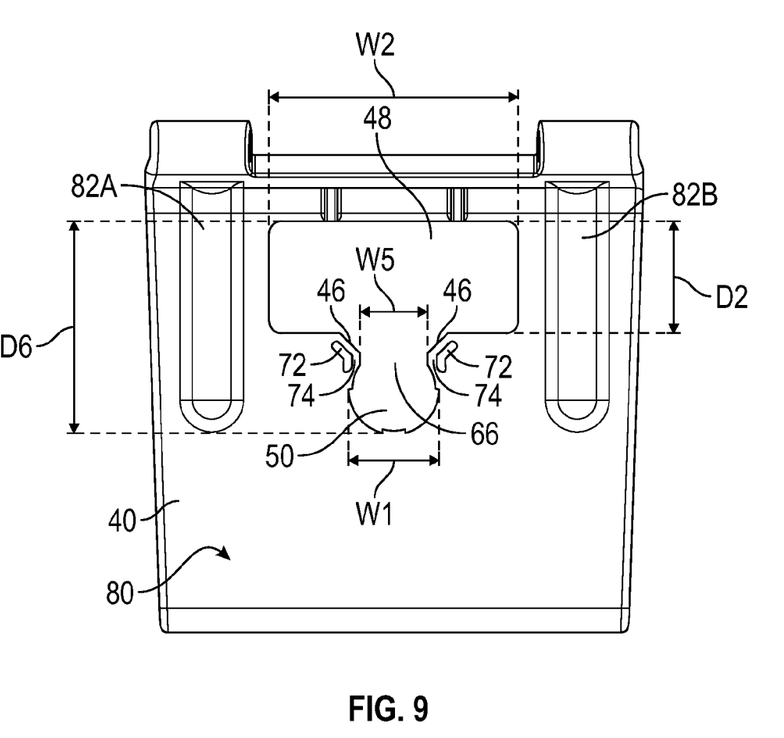
FIG. 9 is a schematic illustration in plan view of the lower leaf of FIG. 4.

As best shown in FIG. 9, the hinge assembly 20 defines an aperture 48 and a notch 50 narrower than the aperture 48 that extends from the aperture 48. The notch 50 is generally rounded with a maximum width W1. The aperture 48 has a width W2 that is greater than width W1.

As shown in FIG. 7, the head 24 of the anchor 18 has a broad portion 54 and a narrow portion 56 extending from the broad portion 54. The broad portion 54 has a width W3 that is less than the width W2 of the aperture 48. The broad portion 54 also has a depth D1 that is less than a depth D2 of the aperture 48. The depth D5 of both the broad portion 54 and the narrow portion 56 together is less than a depth D6 of the aperture 48 and the notch 50 together, permitting the head 24 to be received in the aperture 48.

Figure 11:
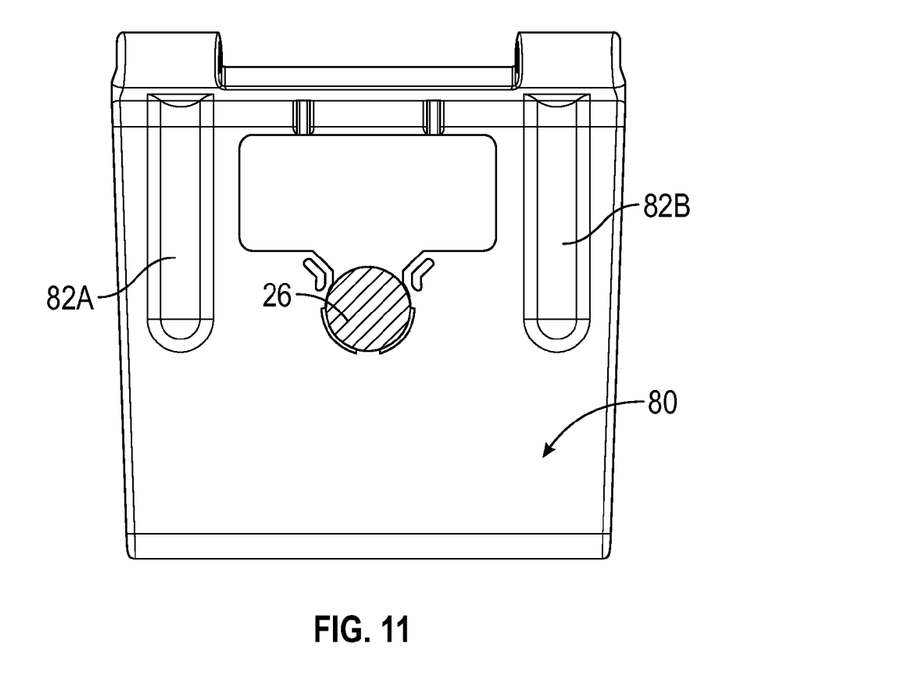
FIG. 11 is a schematic illustration in plan view of the lower leaf of FIG. 9 with the pin of the anchor in cross-sectional view retained in a notch of the lower leaf.
Figure 14:
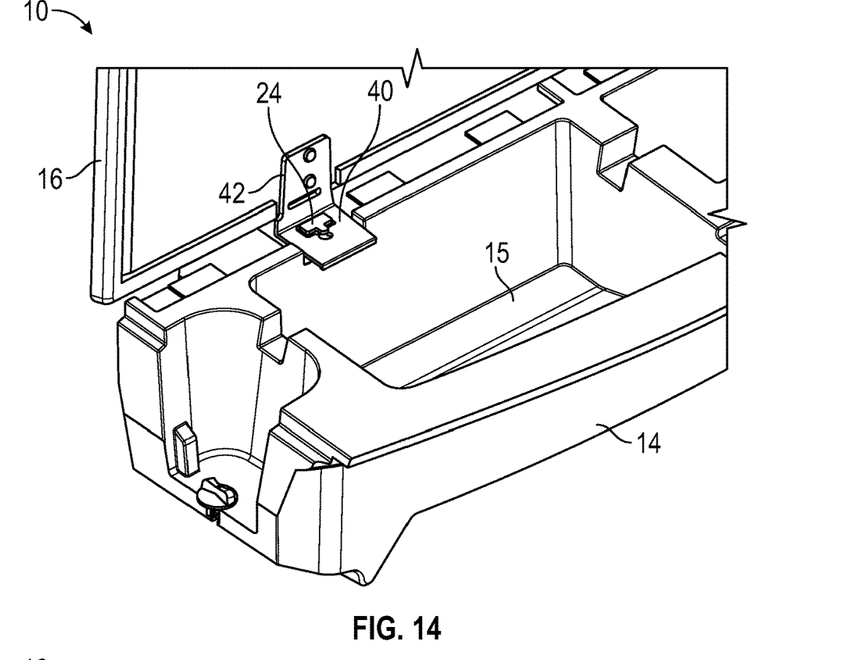
FIG. 14 is a schematic fragmentary illustration of the lid and the bin, with the head of the anchor passed through the aperture.

As shown in FIG. 9, the first leaf 40 has protrusions 46 that define a neck 66 between the aperture 48 and the notch 50. Additionally, a width W4 of the narrow portion 56 shown in FIG. 7 is less than a width W5 of the neck 66 shown in FIG. 9. Given these relative widths and depths, the head 24 can pass through the aperture 48 when the aperture 48 is aligned with the head 24 as shown in FIG. 13, and the lid 16 with the hinge assembly 20 thereon is lowered toward the head 24 until the first leaf 40 rests on the shelf 27, as shown in FIG. 14. The lid 16 is then translated in the direction of force arrow F shown in FIGS. 11 and 15 toward an edge 70 of the bin 14, causing the pin 26 to contact the protrusions 46 of the first leaf 40.

As shown in FIG. 9, each of the protrusions 46 has a slot 72 extending therethrough, so that the protrusions 46 include strips 74 at the neck 66. Each strip 74 is a portion of the protrusion 46 that borders the slot 72 and is between the slot 72 and the aperture 48. Each strip 74 functions as a resilient, single leaf spring that elastically deforms under sufficient force, but is biased to return to an undeformed position shown in FIGS. 9 and 11. The strip 74 can flex away from the aperture 48 to broaden the width of the neck 66 due to the dimensional compliance afforded by the slots 72. The protrusions 46 resiliently flex at the strips 74 under force of the pin 26 against the translating first leaf 40, permitting the pin 26 to pass the protrusions 46 into the notch 50. The protrusions 46 are biased toward the unflexed position (i.e., the undeformed state of FIGS. 9 and 11) when the pin 26 is in the notch 50, trapping the pin 26 in the notch 50. The transition of the strips 74 from the undeformed state to the deformed state and then back to the undeformed state as the pin 26 passes into the notch 50 or out of the notch 50, respectively, may be referred to as snapping or clipping of the strips 74 and may make a distinct snapping sound which could be used by the installer as a signal of the location of the pin 26.

Figure 10:
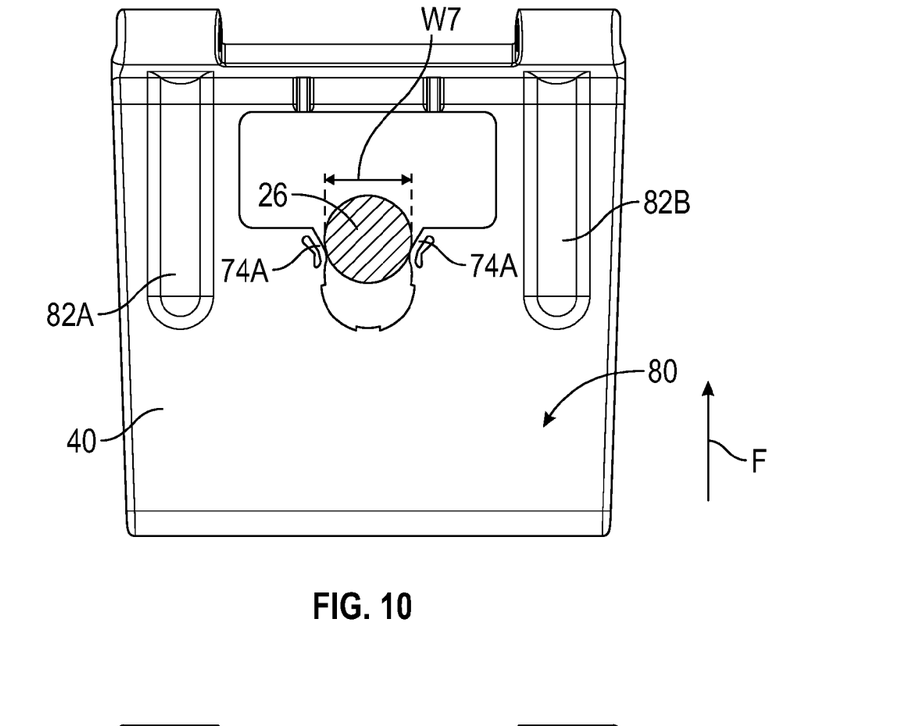
FIG. 10 is a schematic illustration in plan view of the lower leaf of FIG. 9 and a pin of the anchor in cross-sectional view extending through an aperture in the lower leaf and forcing protrusions of the lower leaf to flex.

For example, as shown in FIG. 10, when the first leaf 40 is translated with sufficient force F after the head 24 has passed through the aperture 48 so that the pin 26 is extending through the aperture 48, the pin 26 will press against the strips 74 and the strips 74 will compress away from the pin 26 to a deformed state 74A shown in FIG. 8. With the strips 74 in the deformed state 74A, the width between the strips 74 increases from the width W5 of the neck 66 to the width W7 of the pin 26, allowing the pin 26 to slip into the notch 50, while the spring strips 74 return to the undeformed state. The first leaf 40 thus releasably clips to the pin 26. Because the notch 50 has a width W1 equal to or greater than the width W7 of the pin 26, the notch 50 is configured to receive the pin 26 when the hinge assembly 20 is translated toward the pin 26 with the head 24 through the aperture 48. The first leaf 40 thus releasably clips to the pin 26 to retain the hinge assembly 20 in an engaged position when the notch 50 receives the pin 26. Because the pin 26 has a circular cross-section in the embodiment shown, the width W7 may be the same as the diameter of the pin 26. In other embodiments, the pin 26 could have a different cross-sectional shape with a width W7.

In the embodiment shown, the broad portion 54 and the narrow portion 56 of the head 24 are in a T-formation. The aperture 48 and the notch 50 of the first leaf 40 are also in a T-formation. The pin 26 extends from the broad portion 54 at a lower surface 60 of the head 24, as best shown in FIG. 8. The narrow portion 56 extends from the broad portion 54 in a common direction as the notch 50 extends from the aperture 48 when the hinge assembly 20 is in the engaged position. Stated differently, the narrow portion 56 and the notch 50 both extend toward the same edge 62 of the first leaf 40 when the hinge assembly 20 is in the engaged position of FIG. 3.

The narrow portion 56 of the head 24 has a width W4 that is greater than the width W1 of the notch 50 so that the narrow portion 56 cannot pass downward through the notch 50 once the pin 26 is in the notch 50. Instead, the first leaf 40 remains sandwiched between the narrow portion 56 of the head 24 and the shelf 27 of the base 22 until the lid 16 is selectively translated in a direction opposite to the direction of arrow F in FIG. 10, so that the pin 26 deforms the strip 74 again, and the pin 26 passes out of the notch 50. The head 24 can then pass out of the aperture 48 allowing the lid 16 to be lifted away from the anchor 18. When the pin 26 is in the notch 50, the narrow portion 56 of the head 24 is over the surface 80, and the broad portion 54 overlies the protrusions 46 on either side of the pin 26, further sandwiching the first leaf 40 in the gap. This minimizes motion of the first leaf 40 relative to the anchor 18, with the exception of motion of the first leaf 40 under a sufficient force in the opposite direction of force F in FIG. 10 when it is desired to detach the lid 16 from the bin 14. The hinge axis A is offset from the aperture 48 and is positioned to clear the edge 70 when the lid 16 is pivoted about the axis A as best shown in FIG. 12.

The pin 26 has a height such that a gap G exists between the base 22 and the head 24, as best shown in FIGS. 8 and 12. Stated differently, the head 24 has a lower surface 60 facing the base 22. The lower surface 60 is spaced apart from the base 22 by the gap G. The thickness of the first leaf 40 is less than the width of the gap G, enabling the first leaf 40 to fit within the gap G, as shown in FIG. 12.

Optionally, the anchor 18 may have additional features that assist in clamping, tightening, and stabilizing the first leaf 40 within the gap G. For example, as shown in FIG. 8, multiple ribs 76 extend from the lower surface 60 of the head 24 in the gap G toward the base 22. The ribs 76 lessen the width of the gap G and thus clamp the first leaf 40 between the base 22 and the head 24. The ribs 76 may be integral with the first leaf 40 as a unitary plastic component, or may be a different material than the plastic first leaf 40, such as a compliant rubber. Tightening the first leaf 40 via the ribs 76 helps to minimize noise, and prevents side-to-side rocking of the lid 16 about the hinge assembly 20. The ribs 76 may increase and evenly distribute the contact area of the first leaf 40 with the anchor 18. In the embodiment shown, the ribs 76 extend outward along the surface 60 from the pin 26. Although multiple ribs are shown, the anchor 18 could have only one rib 76 in another embodiment.

Another optional feature may be included to further tighten the first leaf 40 between the head 24 and the base 22. As shown in FIGS. 9-12, the first leaf 40 has an upper surface 80 that faces the lower surface 60 of the head 24 when the head 24 is through the aperture 48. The surface 80 has a first rib 82A and a second rib 82B, with the aperture 48 between the first rib 82A and the second rib 82B. The ribs 82A, 82B extend lengthwise generally in the direction of translation of the lid 16 to move the pin 26 into or out of the notch 50 (e.g., along the direction of the force F, or opposite to the direction of the force F in FIG. 10). The ribs 82A, 82B help to level and support the first leaf 40 within the gap G, and reinforce the first leaf 40 due to their increased thickness relative to the remainder of the first leaf 40. This helps to prevent breakage of the first leaf 40 such as when force is applied during use.

A method of securing the lid 16 to the cargo bin 14 includes aligning the aperture 48 in the hinge assembly 20 secured to the lid 16 with the anchor 18 secured to the cargo bin 14. The aperture 48 is sufficiently aligned if it is generally centered at a vertical axis V that extends through a center of the head 24. If two anchors 18 spaced apart from one another and two hinge assemblies 20 are included in the cargo system 10 as shown in FIG. 1, then the aperture 48 of each is aligned with the respective head 24.

Under the method, the lid 16 is then moved toward the anchor 18 along the axis V, with the lid 16 positioned over the bin 14 as shown in FIG. 13, until the head 24 of the anchor 18 passes through the aperture 48, as shown in FIG. 14. This may be accomplished with a simple visual alignment of the head 24 with the aperture 48 by the operator. This alignment may even be accomplished "blindly", i.e., without seeing the aperture 48, by generally centering the lid 16 over the bin 14.

Next, the lid 16 is translated in a first direction (i.e., the direction of the arrow F), until the pin 26 connected to the head 24 is forced past the protrusions 46 of the hinge assembly 20 and into the notch 50 by elastically deforming the strips 74, with the strips 74 then resiliently returning to an undeformed state that clips the pin into the notch 50, retaining the hinge assembly 20 in an engaged position when the notch 50 receives the pin 26. The strips 74 provide a robust snapping engagement when the strips 74 return to their undeformed state. The first leaf 40 including the protrusions 46 and the strips 74 may be plastic of a sufficient strength and flexibility to provide robust retention of the hinge assembly 20 and durability for repeated cycling and reuse.

Figure 15:
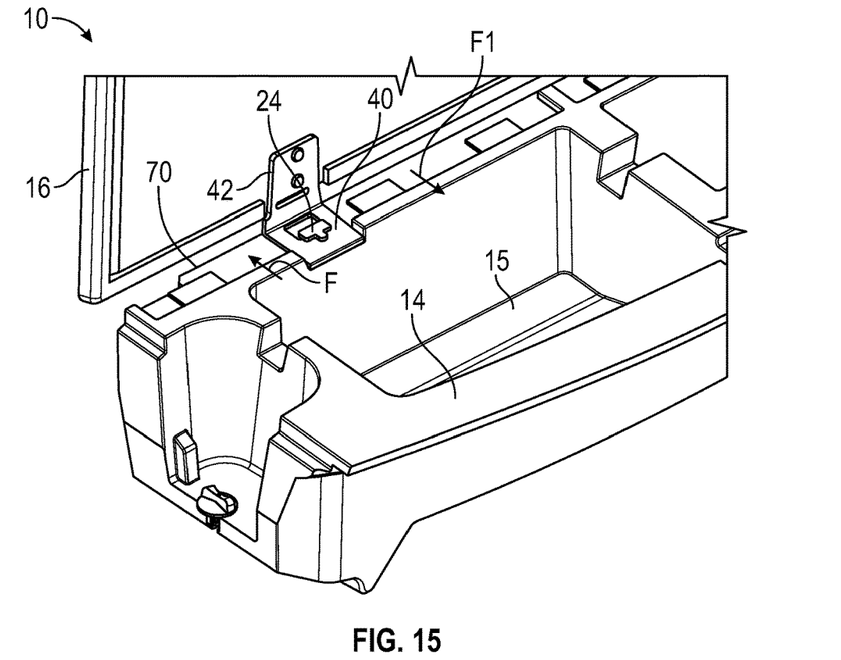
FIG. 15 is a schematic fragmentary illustration of the lid and the bin, with the pin of the anchor forced into the notch in the lower leaf, so that the lid is secured to the bin.

In the engaged position, the lid 16 can be pivoted at the hinge axis A of the hinge assembly 20 between the first position of FIG. 16 and the second position of FIG. 15. The offset of the hinge axis A from the edge 70 of the bin 14 and the slight gap G1 between the lid 16 and the portion of the load floor 17 shown in FIG. 12 are configured to allow pivoting of the lid 16 over at least a 90 degree range between the closed position of FIGS. 12 and 16 and the open position of FIG. 15.

If it is desired to completely remove the lid 16 to utilize the cavity 15 without the lid 16 secured to the bin 14, the lid 16 can be detached from the bin 14 by reversing the motions used to secure the lid 16 to the bin 14. First, the lid 16 is translated in a second direction opposite from the first direction, i.e., in the direction of force F1 in FIG. 15 to force the pin 26 past the protrusions 46 and into the aperture 48, releasing the hinge assembly 20 from the pin 26. The strips 74 flexibly deform to the state 74A under a sufficient force F1, allowing the pin 26 to move out of the notch 50 and into the position shown in FIG. 14. The lid 16 is then moved away from the anchor 18 by lifting the lid 16 so that the first leaf 40 moves up along the axis V in FIG. 13 until the head 24 of the anchor 18 passes through the aperture 48 and the aperture 48 is above the anchor 18.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A system comprising:
a hinge assembly;
an anchor having a base, a head spaced apart from the base by a gap, and a pin;
wherein:
the pin spans the gap, and the base is connected to the head only via the pin;
the hinge assembly defines an aperture and a notch narrower than the aperture extending from the aperture;
the head fits through the aperture;
the notch is configured to receive the pin when the hinge assembly is translated toward the pin with the head through the aperture; and
the hinge assembly releasably clips to the pin to retain the hinge assembly in an engaged position when the notch receives the pin.

2. The system of claim 1, wherein:
the hinge assembly has a first leaf that defines the aperture, and has a second leaf hinged to the first leaf and pivotable relative to the first leaf about a hinge axis offset from the aperture;
the head has a broad portion and a narrow portion extending from the broad portion;
the pin extends from the broad portion; and
the first leaf is sandwiched between the base and the head when the hinge assembly is in the engaged position.

3. The system of claim 2, wherein the broad portion and the narrow portion are in a T-formation with the narrow portion extending from the broad portion in a common direction as the notch extends from the aperture when the hinge assembly is in the engaged position.

4. The system of claim 2, wherein:
the first leaf has projections that define a neck between the aperture and the notch;
the pin is wider than the neck;
each of the projections has a slot extending therethrough adjacent the neck;
the projections resiliently flex at the slot under a force of the pin against the projections, permitting the pin to move past the projections into the notch; and
the projections are biased toward an unflexed position when the pin is in the notch, trapping the pin in the notch.

5. The system of claim 2, wherein:
the head has a surface facing the base;
the surface is spaced apart from the base by a gap;
at least one rib extends from the surface in the gap toward the base; and
the at least one rib clamps the first leaf between the base and the head.

6. The system of claim 5, wherein the at least one rib includes multiple ribs extending outward from the pin.

7. The system of claim 2, wherein:
the first leaf has a surface that faces the head when the head is through the aperture; and
the surface has a first rib and a second rib, with the aperture between the first rib and the second rib.

8. The system of claim 1, wherein:
the base includes a shelf with a first face and a second face opposite from the first face;
the pin extends outward from the first face;
the base includes at least one stake extending outward from the second face generally parallel with the pin; and
the at least one stake has barbs.

9. The system of claim 1, further comprising:
a bin defining a cavity;
a lid;
wherein the anchor is secured to the bin adjacent the cavity;
wherein the hinge assembly has a first leaf that has the aperture, and has a second leaf hinged to the first leaf and pivotable relative to the first leaf about a hinge axis offset from the aperture;
wherein the second leaf is secured to the lid; and
the lid pivots with the hinge assembly about the hinge axis between a first position in which the lid covers the cavity, and a second position in which the cavity is exposed.

10. The system of claim 9, wherein:
the bin includes a foam material;
the base includes a shelf with a first face and a second face opposite from the first face;
the pin extends outward from the first face;
the base includes at least one stake extending outward from the second face generally parallel with the pin;
the at least one stake has barbs; and
the at least one stake is engaged in the foam material of the bin.

11. A vehicle comprising:
a cargo system including:
a bin defining a storage cavity;
a lid;
a hinge assembly having a first leaf secured to the lid, and a second leaf pivotable relative to the first leaf about a hinge axis;
an anchor having a base, a head spaced apart from the base by a gap, and a pin;
wherein:
the pin spans the gap, and the base is connected to the head only via the pin;
the base is secured to the bin adjacent the cavity;

the first leaf defines an aperture and has a notch narrower than the aperture extending from the aperture;

the head fits through the aperture;

the notch is configured to receive the pin when the hinge assembly is translated toward the pin with the head through the aperture;

the first leaf releasably clips to the pin to retain the hinge assembly in an engaged position when the notch receives the pin, the lid thereby being secured to the bin; and the lid is pivotable between an open position in which the cavity is exposed, and a closed position in which the cavity is covered by the lid when the hinge assembly is in the engaged position.

12. The vehicle of claim 11, further comprising:

a first load floor portion at least partially surrounding the bin above the cavity; and wherein the lid is a second load floor portion, and is substantially level and flush with the first load floor portion when the lid is in the closed position.

13. The vehicle of claim 11, wherein:

the bin includes a foam material;

the base includes at least one stake;

the at least one stake has barbs; and the at least one stake is engaged in the foam material of the bin.

14. The vehicle of claim 11, wherein:

the head has a broad portion and a narrow portion extending from the broad portion;

the pin extends from the broad portion; and the first leaf is sandwiched between the base and the head when the hinge assembly is in the engaged position.

15. The vehicle of claim 14, wherein:

the bin includes a foam material;

the base includes at least one stake;

the at least one stake has barbs; and the at least one stake is engaged in the foam material of the bin.

16. The vehicle of claim 14, wherein:

the head has a surface facing the base;

the surface is spaced apart from the base by a gap;

at least one rib extends from the surface in the gap toward the base; and the at least one rib clamps the first leaf between the base and the head.

17. The vehicle of claim 11, wherein:

the first leaf has a surface that faces the head when the hinge assembly is secured to the anchor; and the surface has a first rib and a second rib, with the aperture between the first rib and the second rib.

18. A method of securing a lid to a cargo bin, the method comprising:

aligning an aperture in a hinge assembly secured to the lid with an anchor secured to the cargo bin;

moving the lid toward the anchor with the lid over the bin until a head of the anchor passes through the aperture; and translating the lid in a first direction until a pin connected to the head is forced past protrusions of the hinge assembly into a notch in the hinge assembly extending from the aperture, the hinge assembly thereby releasably clipping to the pin.

19. The method of claim 18, further comprising:

pivoting the lid at a hinge axis of the hinge assembly between a first position and a second position; wherein the lid covers the cavity in the first position, and the cavity is exposed when the lid is in the second position.

20. The method of claim 18, further comprising:

translating the lid in a second direction opposite from the first direction until the pin is forced past the protrusions into the aperture, releasing the hinge assembly from the pin; and moving the lid away the anchor until the head of the anchor passes through the aperture and the aperture is above the anchor, the lid thus being disconnected from the bin.

\* \* \* \* \*